US012671142B2

(12) United States Patent
Yang

(10) Patent No.: US 12,671,142 B2
(45) Date of Patent: Jun. 30, 2026

(54) BATTERY PACK, ELECTRIC WHEELCHAIR, AND VEHICLE

(71) Applicant: LG ENERGY SOLUTION, LTD., Seoul (KR)

(72) Inventor: Seong-Hwan Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 581 days.

(21) Appl. No.: 18/034,313

(22) PCT Filed: Jan. 4, 2022

(86) PCT No.: PCT/KR2022/000097
§ 371 (c)(1),
(2) Date: Apr. 27, 2023

(87) PCT Pub. No.: WO2022/149831
PCT Pub. Date: Jul. 14, 2022

(65) Prior Publication Data
US 2024/0006711 A1 Jan. 4, 2024

(30) Foreign Application Priority Data
Jan. 11, 2021 (KR) ........................ 10-2021-0003198

(51) Int. Cl.
*H01M 50/383* (2021.01)
*H01M 10/42* (2006.01)
(Continued)

(52) U.S. Cl.
CPC ....... *H01M 50/383* (2021.01); *H01M 10/425* (2013.01); *H01M 50/249* (2021.01);
(Continued)

(58) Field of Classification Search
CPC ............. H01M 50/383; H01M 50/249; H01M 50/3425; H01M 50/375
See application file for complete search history.

(56) References Cited

U.S. PATENT DOCUMENTS 10,333,122 B2 6/2019 Miyawaki
11,462,799 B2 10/2022 Ahn et al.
(Continued)

FOREIGN PATENT DOCUMENTS

JP 2013-131453 A 7/2013
JP 2014-110138 A 6/2014
(Continued)

OTHER PUBLICATIONS

International Search Report (with translation) and Written Opinion dated Apr. 19, 2022, for corresponding International Patent Application No. PCT/KR2022/000097.
(Continued)

*Primary Examiner* — Olatunji A Godo
(74) *Attorney, Agent, or Firm* — Morgan, Lewis & Bockius LLP

(57) ABSTRACT

A battery pack includes a plurality of battery cells, each configured to discharge an internal material to an outside by an internal pressure when the internal pressure is greater than a predetermined pressure; a cell frame configured to accommodate the plurality of battery cells so that the internal material is discharged in at least one direction; one or more guide covers configured to cover at least one side of the plurality of battery cells, at least a portion of the one or more guide covers is spaced apart from the cell frame by a predetermined distance to form a moving passage through which the internal material moves; and a pack housing having an accommodation space configured to accommodate the cell frame therein and a discharge portion such that
(Continued)

a portion facing a distal end of the moving passage is configured to be perforated by the internal material.

10 Claims, 12 Drawing Sheets

(51) Int. Cl.

| | |
|---|---|
| *H01M 50/249* | (2021.01) |
| *H01M 50/342* | (2021.01) |
| *H01M 50/367* | (2021.01) |
| *H01M 50/375* | (2021.01) |

(52) U.S. Cl.

CPC ..... *H01M 50/3425* (2021.01); *H01M 50/367* (2021.01); *H01M 50/375* (2021.01); *H01M 2010/4271* (2013.01); *H01M 2220/20* (2013.01)

(56) References Cited

U.S. PATENT DOCUMENTS

| | | | | |
|---|---|---|---|---|
| 11,462,801 | B2 | 10/2022 | Lee | |
| 12,068,499 | B2 | 8/2024 | Yoshida et al. | |
| 12,183,942 | B2 | 12/2024 | Wakabayashi et al. | |
| 2009/0104516 | A1* | 4/2009 | Yoshihara | H01M 50/503 |
| | | | | 429/149 |
| 2012/0164490 | A1 | 6/2012 | Itoi et al. | |
| 2012/0262109 | A1* | 10/2012 | Toya | H01M 10/44 |
| | | | | 320/108 |
| 2012/0328918 | A1 | 12/2012 | Kim | |
| 2014/0154541 | A1 | 6/2014 | Asakura et al. | |
| 2016/0093857 | A1 | 3/2016 | DeKeuster et al. | |
| 2019/0207179 | A1 | 7/2019 | Sugiyama et al. | |
| 2019/0296280 | A1 | 9/2019 | Stickel et al. | |
| 2020/0058973 | A1 | 2/2020 | Golubkov | |
| 2021/0320374 | A1 | 10/2021 | Lee et al. | |
| 2022/0069411 | A1 | 3/2022 | Wakabayashi et al. | |
| 2022/0123428 | A1 | 4/2022 | Wakabayashi et al. | |

FOREIGN PATENT DOCUMENTS

| | | |
|---|---|---|
| JP | 5709908 B2 | 4/2015 |
| JP | 2016-33910 A | 3/2016 |
| JP | 2019-142580 A | 8/2019 |
| KR | 10-1669115 B1 | 10/2016 |
| KR | 10-2017-0015141 A | 2/2017 |
| KR | 10-2017-0090261 A | 8/2017 |
| KR | 10-2019-0086853 A | 7/2019 |
| KR | 10-2020-0100407 A | 8/2020 |
| KR | 10-2020-0107213 A | 9/2020 |
| KR | 10-2020-0107214 A | 9/2020 |
| WO | 2020/153016 A1 | 7/2020 |
| WO | 2020/153018 A1 | 7/2020 |
| WO | 2020/188949 A1 | 9/2020 |
| WO | 2021/020328 A1 | 2/2021 |

OTHER PUBLICATIONS

The extended European Search Report (EESR) dated Jul. 9, 2024, issued in corresponding EP Patent Application No. 22736808.1.

Office Action issued in corresponding Korean Patent Application No. 10-2021-0003198, dated Jun. 10, 2025.

Office Action issued in corresponding Japanese Patent Application No. 2023-531091, dated Jun. 10, 2024.

Office Action issued in corresponding Japanese Patent Application No. 2023-531091, dated Jan. 14, 2025.

* cited by examiner

FIG. 6

BATTERY PACK, ELECTRIC WHEELCHAIR, AND VEHICLE

TECHNICAL FIELD

The present disclosure relates to a battery pack, an electric wheelchair, and a vehicle, and more specifically, to a battery pack with improved safety against fire or explosion of a battery cell.

The present application claims priority to Korean Patent Application No. 10-2021-0003198 filed on Jan. 11, 2021 in the Republic of Korea, the disclosures of which are incorporated herein by reference.

BACKGROUND ART

As the demand for portable electronic products such as laptops, video cameras, and mobile phones has rapidly increased in recent years and the development of electric vehicles, energy storage batteries, robots, and satellites has begun in earnest, research on high-performance secondary batteries capable of repeated charge/discharge has been actively conducted.

Currently commercialized secondary batteries include nickel cadmium batteries, nickel hydride batteries, nickel zinc batteries, and lithium secondary batteries. Among them, lithium secondary batteries are in the spotlight because they have almost no memory effect compared to nickel-based secondary batteries, and thus have advantages of free charge/discharge, very low self-discharge rate, and high energy density.

A lithium secondary battery mainly uses a lithium-based oxide and a carbon material as a positive electrode active material and a negative electrode active material, respectively. In addition, the lithium secondary battery includes an electrode assembly in which a positive electrode plate and a negative electrode plate coated with the positive electrode active material and the negative electrode active material, respectively are disposed with a separator interposed therebetween, and a casing, that is, a battery case, for sealing and accommodating the electrode assembly along with an electrolyte.

Additionally, depending on the shape of a casing, lithium secondary batteries may be classified into a can-type secondary battery in which an electrode assembly is embedded in a metal can, and a pouch-type secondary battery in which an electrode assembly is embedded in a pouch of an aluminum laminate sheet.

In particular, recently, moving means or moving devices that move by the rotational force of an electric motor operated by receiving power from a battery pack have been increasing. The demand for battery packs applied to such moving means and moving devices is also increasing.

However, the battery pack has a plurality of battery cells. Thus, when a fire or explosion occurs in at least a portion of the plurality of battery cells, flame and high-temperature gas are ejected from these battery cells, thereby damaging device configurations inside or outside the battery pack, or injuring a user on a moving means or a moving device on which the battery pack is mounted. Accordingly, there is a need for a method to improve the safety against fire or gas explosion of the battery pack.

DISCLOSURE

Technical Problem

The present disclosure is designed to solve the problems of the related art, and therefore the present disclosure is directed to providing a battery pack with improved safety against fire or explosion of a battery cell.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack including:

a plurality of battery cells, each configured to discharge an internal material to the outside by the internal pressure when the internal pressure increases over a predetermined pressure; a cell frame configured to accommodate the plurality of battery cells so that the internal material is discharged in at least one direction; one or more guide covers configured to cover at least one side of the plurality of battery cells, at least a portion of which is spaced apart from the cell frame by a predetermined distance to form a moving passage through which the internal material moves; and a pack housing having an accommodation space for accommodating the cell frame therein and a discharge portion configured such that a portion facing the distal end of the moving passage is perforated by the internal material.

In addition, the discharge portion may be formed to have a relatively thin thickness compared to other portions adjacent to a portion of the pack housing.

Further, the cell frame includes a screen rib protruding to surround the outer periphery of the guide cover, and the guide cover may include a bent portion facing the screen rib and extending in a bent form from the outer periphery in an inward direction.

Moreover, the discharge portion may include a material that melts at a predetermined temperature or higher.

In addition, the battery pack may further include a cover film provided in the moving passage and extending to cover one side from which the internal material of the plurality of battery cells is discharged.

Moreover, the cell frame may include at least one partition rib protruding toward the guide cover and extending along the moving passage.

Also, the guide cover may include a guide rib which is formed at a position corresponding to at least a portion of the plurality of battery cells and is configured to change a moving direction of the internal material discharged from the battery cell to one direction.

In addition, the battery pack further includes a BMS module configured to control charge/discharge of the plurality of battery cells, wherein the BMS module is mounted on the other side opposite to one side facing the plurality of battery cells of the guide cover, and the guide cover may include a reinforcing portion in which a portion of the guide cover is formed to be relatively thicker than the other portion on one side facing the plurality of battery cells.

In another aspect of the present disclosure, there is also provided an electric wheelchair including at least one battery pack.

In still another aspect of the present disclosure, there is also provided a vehicle including at least one battery pack.

Advantageous Effects

According to an embodiment of the present disclosure, the battery pack of the present disclosure includes a pack housing having a guide cover and a discharge portion. Thus, when an internal material is ejected due to abnormal behavior (thermal runaway, explosion) of a plurality of battery cells, the ejected internal material (gas, flame, etc.) may move along a set moving passage and may be discharged to the outside through the discharge portion of the pack housing located at the distal end of the moving passage. Accordingly, in the battery pack of the present disclosure, the generated high-temperature gas and flame may be moved in an intended direction through the moving passage, thereby preventing other components inside the battery pack from being damaged. Furthermore, the battery pack of the present disclosure can be configured to discharge high-temperature gas and flame to a location where damage to an external device or a user adjacent to the battery pack may be minimized, thereby effectively improving the safety of the battery pack.

Since the present disclosure includes a discharge portion formed to be relatively thinner in thickness than other portion adjacent to a portion of the pack housing, the discharge portion is self-perforated by high-temperature gas or flame ejected by thermal runaway or explosion of the plurality of battery cells without an additional separate member or control, thereby effectively discharging the internal material to the outside. Accordingly, in the battery pack of the present disclosure, safety against thermal runaway, fire, and explosion of a plurality of battery cells can be improved without additional components. Ultimately, it is possible to reduce the manufacturing cost of the battery pack.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawings.

FIGS. 5 and 6 are a right perspective view and a left perspective view, respectively, schematically showing some configurations of a battery pack according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
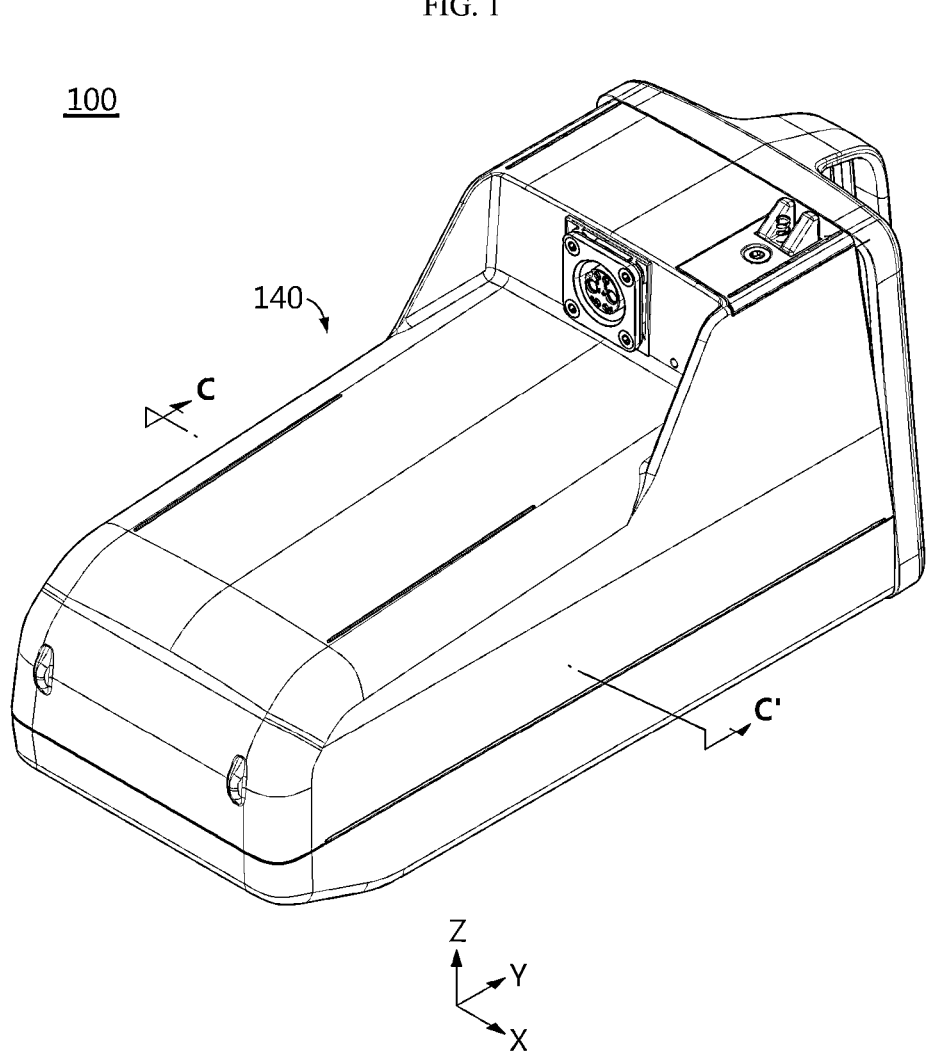
FIG. 1 is a perspective view schematically showing a battery pack according to an embodiment of the present disclosure.
Figure 2:
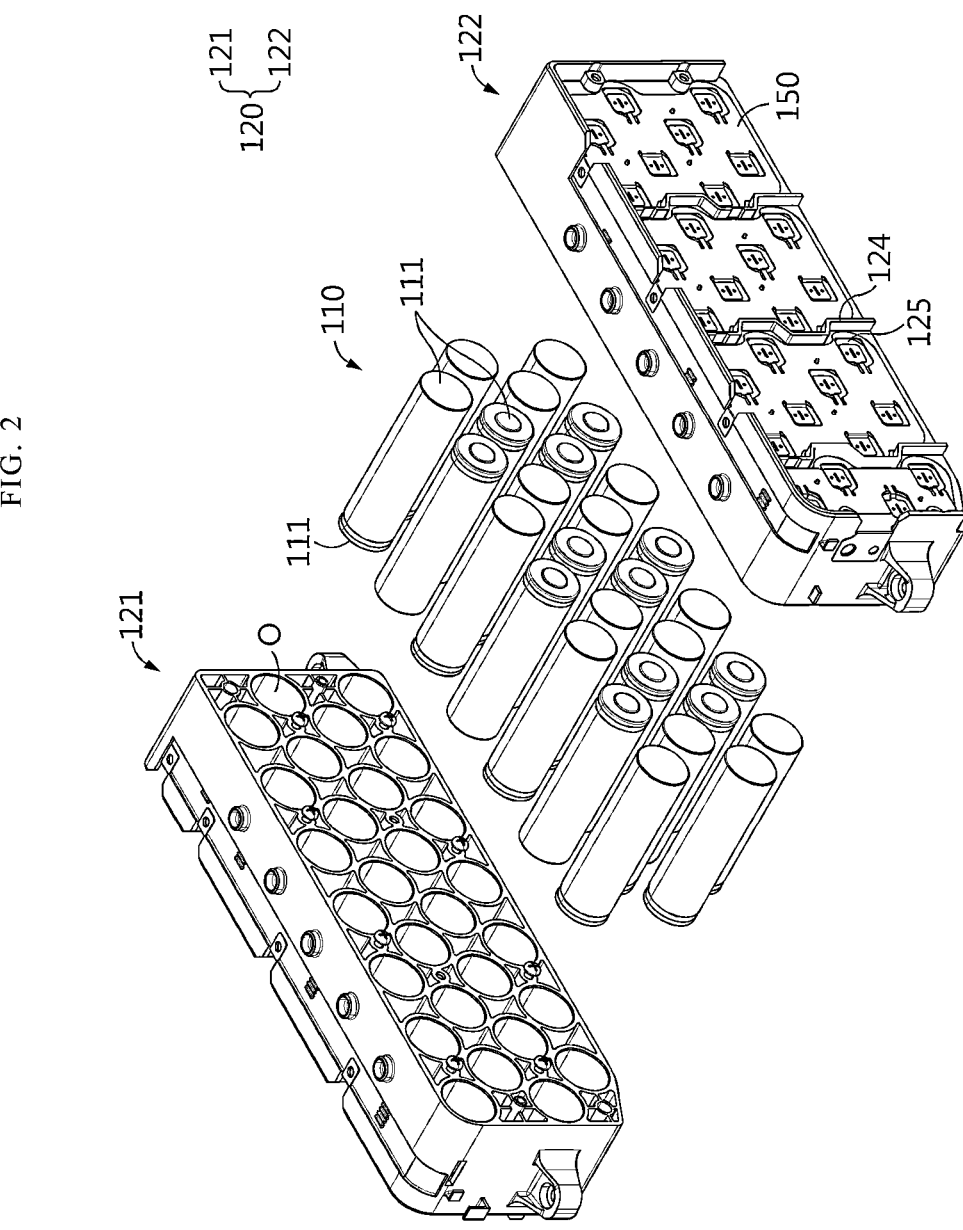
FIG. 2 is an exploded perspective view schematically showing a separated state of the inner configurations of a battery pack according to an embodiment of the present disclosure.
Figure 3:
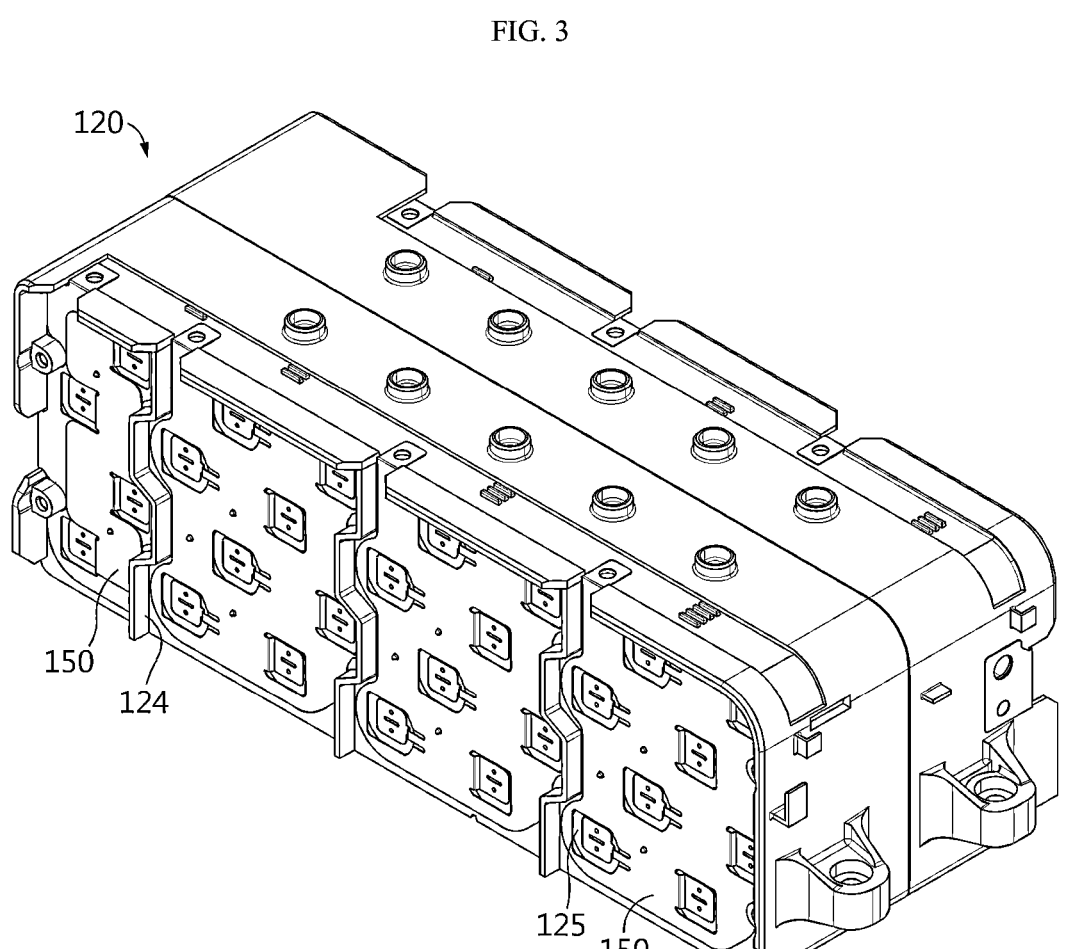
FIG. 3 is a left perspective view schematically showing the inner configurations of a battery pack according to an embodiment of the present disclosure.
Figure 4:
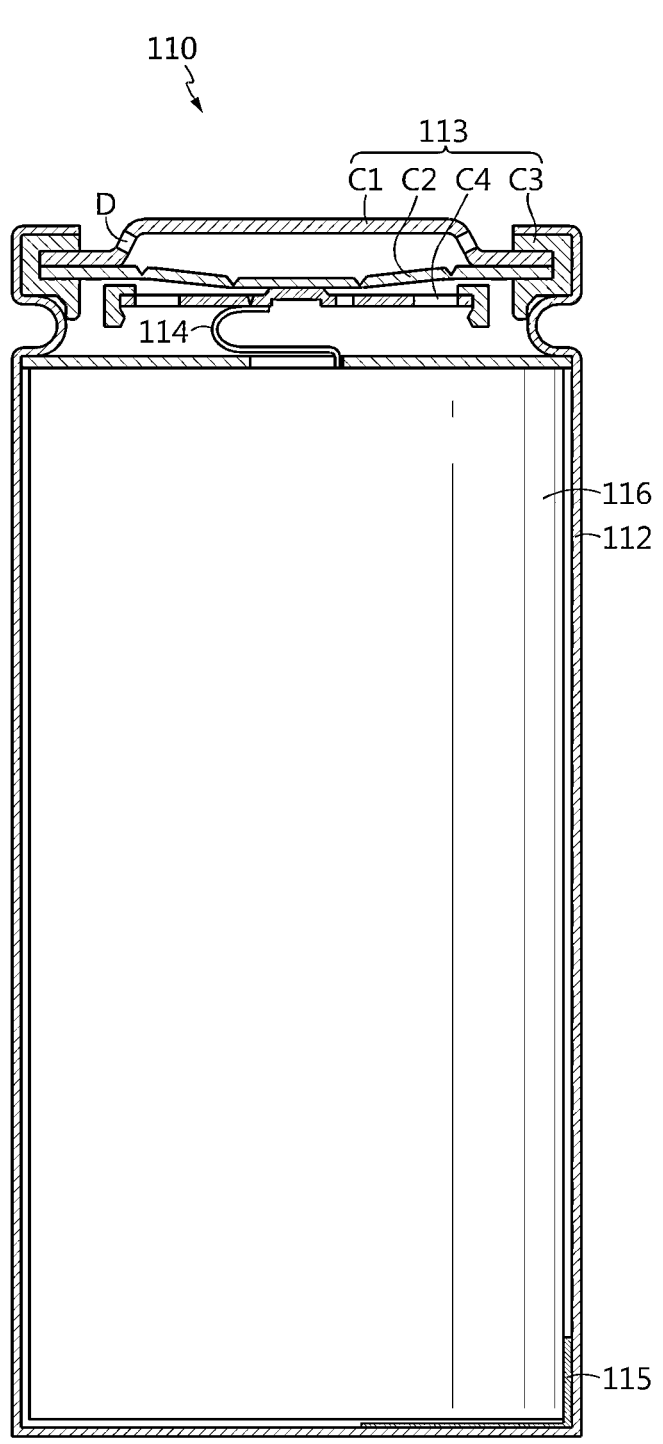
FIG. 4 is a sectional view schematically showing a battery cell of a battery pack according to an embodiment of the present disclosure.
Figure 5:
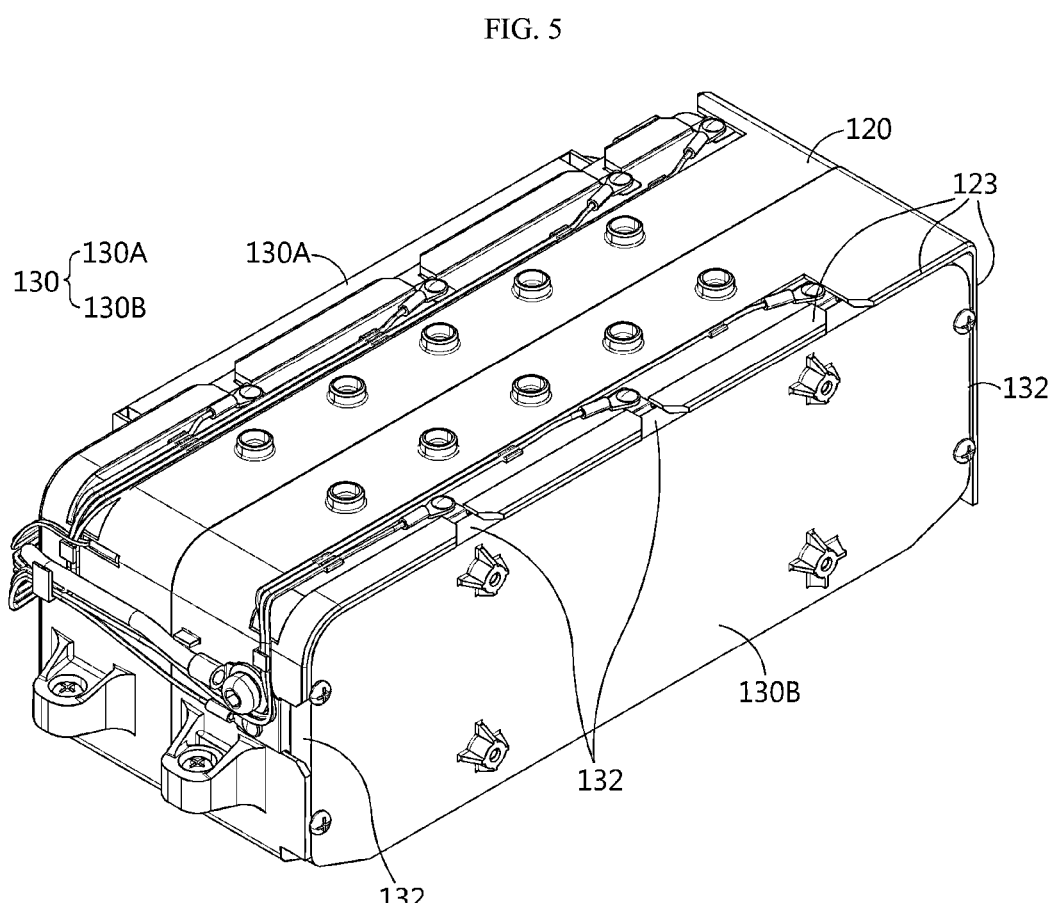
Figure 6:
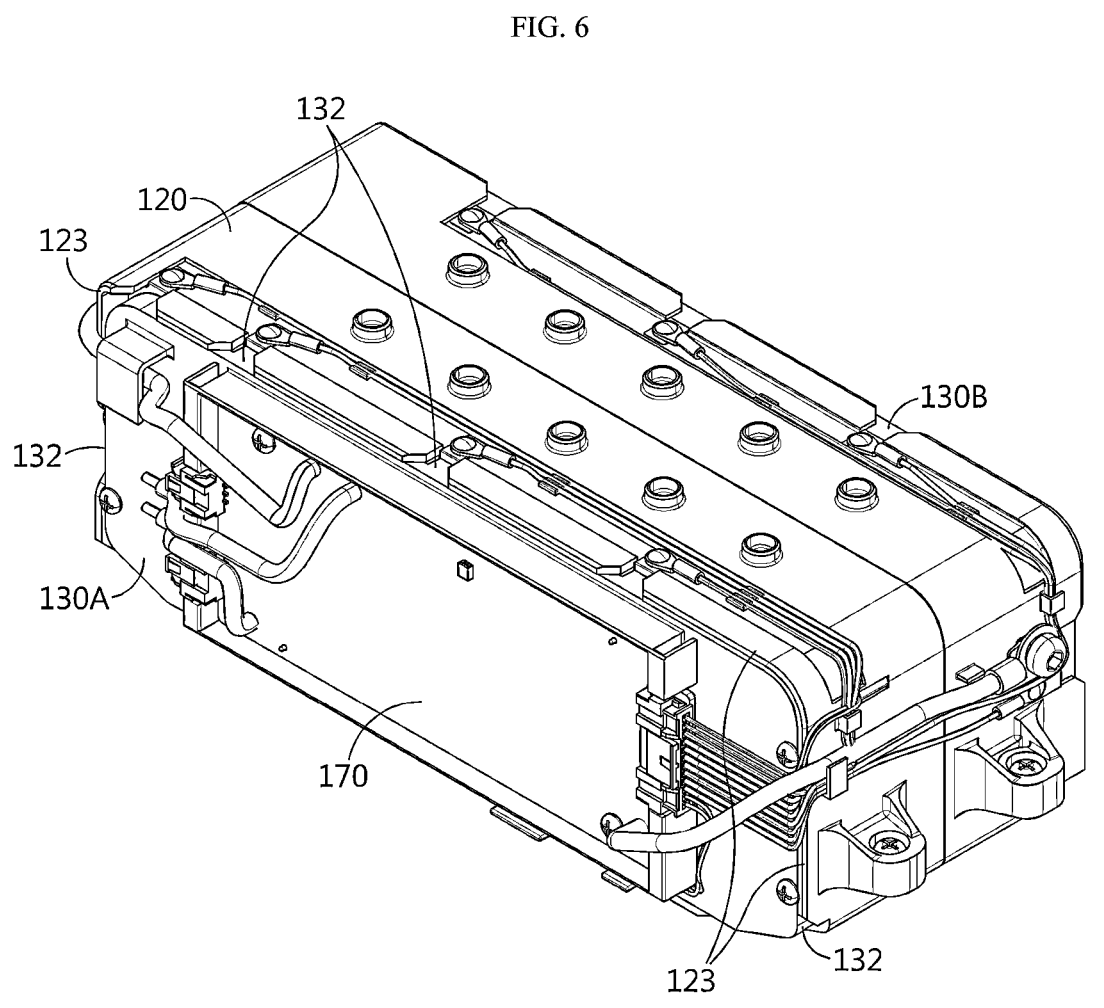

FIG. 1 is a perspective view schematically showing a battery pack according to an embodiment of the present disclosure. FIG. 2 is an exploded perspective view schematically showing a separated state of the inner configurations of a battery pack according to an embodiment of the present disclosure. FIG. 3 is a left perspective view schematically showing the inner configurations of a battery pack according to an embodiment of the present disclosure. FIG. 4 is a sectional view schematically showing a battery cell of a battery pack according to an embodiment of the present disclosure. Also, FIGS. 5 and 6 are a right perspective view and a left perspective view, respectively, schematically showing some configurations of a battery pack according to an embodiment of the present disclosure. For reference, each of the X-axis arrow, the Y-axis arrow, and the Z-axis arrow in FIG. 1 indicates a right direction, a rear direction, and an upward direction, respectively.

Referring to FIGS. 1 to 6, a battery pack 100 according to an embodiment of the present disclosure includes a plurality of battery cells 110, a cell frame 120, one or more guide cover 130, and a pack housing 140.

Referring to FIGS. 2 and 4 again, the plurality of battery cells 110 may be cylindrical battery cells 110. The battery cell 110 may include an electrode assembly 116, an electrolyte (not shown), a battery can 112, and a cap assembly 113.

The electrode assembly 116 may have a structure in which a positive electrode plate and a negative electrode plate are wound with a separator interposed there between. Herein, a positive electrode tab 114 may be attached to the positive electrode plate to be connected to the cap assembly 113 and a negative electrode tab 115 may be attached to the negative electrode plate to be connected to a lower end of the battery can 112.

The battery can 112 may have an empty space formed therein to accommodate the electrode assembly 116 therein.

In particular, the battery can 112 may be configured in a cylindrical shape with an open top. Also, the battery can 112 may be made of a metal material such as steel or aluminum to secure rigidity. In addition, the battery can 112 has the negative electrode tab attached to its lower end, so that not only a lower portion of the battery can 112 but also the battery can 112 itself may function as a negative electrode terminal.

In addition, the battery cell 110 may have electrode terminals 111 located at one end and the other end thereof, respectively. For example, a positive electrode terminal may be formed at the left end of any one battery cell 110, and a negative electrode terminal may be formed at the right end thereof. In the other battery cell 110, a positive electrode terminal and a negative electrode terminal may be formed at positions opposite to the positions of the positive electrode terminal and the negative electrode terminal of the battery cell 110 described above. The plurality of battery cells 110 may be electrically connected by a connection plate 150 including a metal material. The plurality of battery cells 110 may be electrically connected in series, in parallel, or in series and in parallel by the connection plate 150. For example, the plurality of connection plates 150 may be mounted on the left side and the right side of the cell frame 120, respectively.

As shown in FIG. 2, four connection plates 150 may be mounted on the right side of the cell frame 120. As shown in FIG. 3, four connection plates 150 may be mounted on the left side of the cell frame 120.

Referring to FIG. 4 again, the cap assembly 113 may be coupled to a top opening of the battery can 112 to seal the open end of the battery can 112. The cap assembly 113 may have a circular or rectangular shape depending on the shape of the battery can 112, and may include sub-components such as a top cap C1, a vent unit C2, and a gasket C3.

Herein, the top cap C1 may be located at an uppermost portion of the cap assembly 113 and configured to protrude upward. In particular, the top cap C1 may function as the positive electrode terminal 111 in the battery cell 110. Accordingly, the top cap C1 may be electrically connected to another battery cell 110 or a charging device through an external device, for example, the connection plate 150 in FIG. 2. The top cap C1 may be formed of, for example, a metal material such as stainless steel or aluminum. When a severe explosion or fire occurs in the battery cell 110, at least a portion of the top cap C1 may be torn or detached from the battery can 112 to the outside, and thus the battery can 112 may be opened.

In addition, each of the plurality of battery cells 110 may be configured to discharge an internal material to the outside by the internal pressure when the internal pressure increases over a predetermined pressure. For example, the internal material may be gas and flame generated inside the battery cell 110. The internal material may be, for example, fragments of an electrode assembly, an electrolyte, and the like. For example, the vent unit C2 may be configured such that the shape of the vent unit C2 is deformed (ruptured) when the internal pressure of the battery cell 110, namely the internal pressure of the battery can 112, increases over a predetermined level, so that the gas inside the battery can 112 may be discharged to the outside through an opening D of the top cap C1. Herein, the predetermined level of the internal pressure may be 2 atmospheres or more.

Moreover, the gasket C3 may be made of a material having electric insulation so that edge portions of the top cap C1 and the vent unit C2 may be insulated from the battery can 112.

Meanwhile, the cap assembly 113 may further include a current interrupt device C4. The current interrupt device C4 is also called CID. When the internal pressure of the battery increases due to gas generation and thus the shape of the vent unit C2 is reversed, the contact between the vent unit C2 and the current interrupt device C4 may be cut off or the current interrupt device C4 may be damaged to block the electrical connection between the vent unit C2 and the electrode assembly 116.

The configuration of the cylindrical battery cell 110 is widely known to those skilled in the art at the time of filing of this application and thus will not be described in detail herein. In addition, although an example of the cylindrical battery cell 110 is illustrated in FIG. 2, the battery pack 100 according to the present disclosure is not limited to the configuration of the cylindrical battery cell 110 having a specific shape. In other words, various types of battery cells 110 known at the time of filing of this application may be employed in the battery pack 100 according to the present disclosure.

Referring to FIGS. 2 and 3 again, the cell frame 120 may include a first frame 121 and a second frame 122. Sides of the first frame 121 and the second frame 122 facing each other may be coupled to each other. The cell frame 120 may be configured to accommodate the plurality of battery cells 110 therein. Each of the first frame 121 and the second frame 122 may have a plurality of hollows O configured such that a portion of the plurality of battery cells 110 is inserted therein. The cell frame 120 may be configured to accommodate the plurality of battery cells 110 so that the internal material is discharged in at least one direction. The cell frame 120 may include a plurality of exposure holes 125. Each of the plurality of exposure holes 125 may be formed by perforating a portion of the cell frame 120 so that the electrode terminal 111 of each of the plurality of battery cells 110 may be exposed to the outside. For example, as shown in FIGS. 2 and 3, a plurality of exposure holes 125 may be located on each of the left side surface of the first frame 121 and the right side surface of the second frame 122.

In addition, referring to FIGS. 4, 5 and 6 again, one or more guide cover 130 may be configured to cover at least one side of the plurality of battery cells 110. Particularly, it may be configured to cover one side where the vent unit C2 of each of the plurality of battery cells 110 is located. For example, the guide cover 130 may be configured to cover the plurality of exposure holes 125 of the cell frame 120 in which the plurality of battery cells 110 are accommodated.

Figure 7:
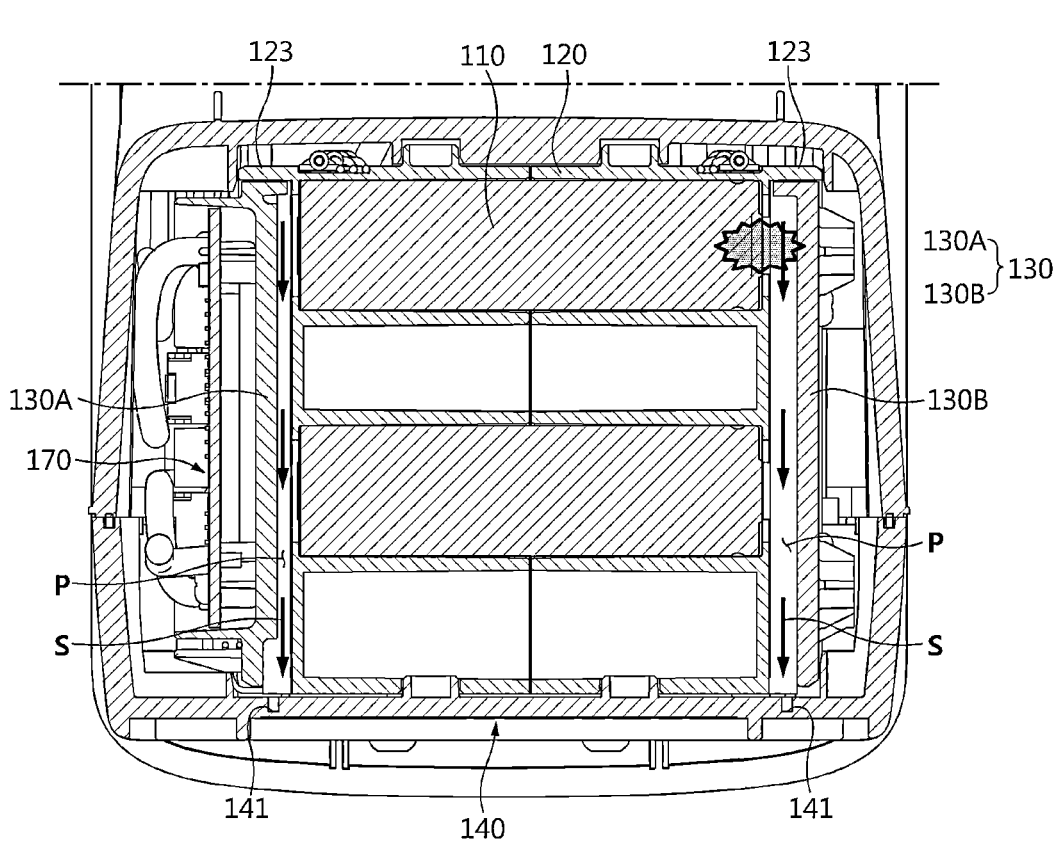
FIG. 7 is a partial vertical cross-sectional view schematically showing a state taken along line C-C' in FIG. 1 of a battery pack according to an embodiment of the present disclosure.

FIG. 7 is a partial vertical cross-sectional view schematically showing a state taken along line C-C' in FIG. 1 of a battery pack according to an embodiment of the present disclosure.

Referring to FIG. 7 along with FIGS. 1, 5 and 6 again, at least a portion of the guide cover 130 may be configured to be spaced apart from the cell frame 120 by a predetermined distance to form a moving passage P. The moving passage P may be configured to allow the internal material S discharged from each of the plurality of battery cells 110 to move. For example, as shown in FIG. 7, a portion of the guide cover 130 is spaced apart from the left side of the cell frame 120 by a predetermined distance to form the moving passage P through which gas or flame can move.

In addition, the guide cover 130 may include, for example, at least one of nylon and glass fiber. For example, the guide cover 130 may include a material in which polyamide and glass fiber are mixed in a weight ratio of 75 wt % and 25 wt %, respectively. Alternatively, the guide cover 130 may include a mica material. The guide cover 130 may include a mica sheet.

Figure 8:
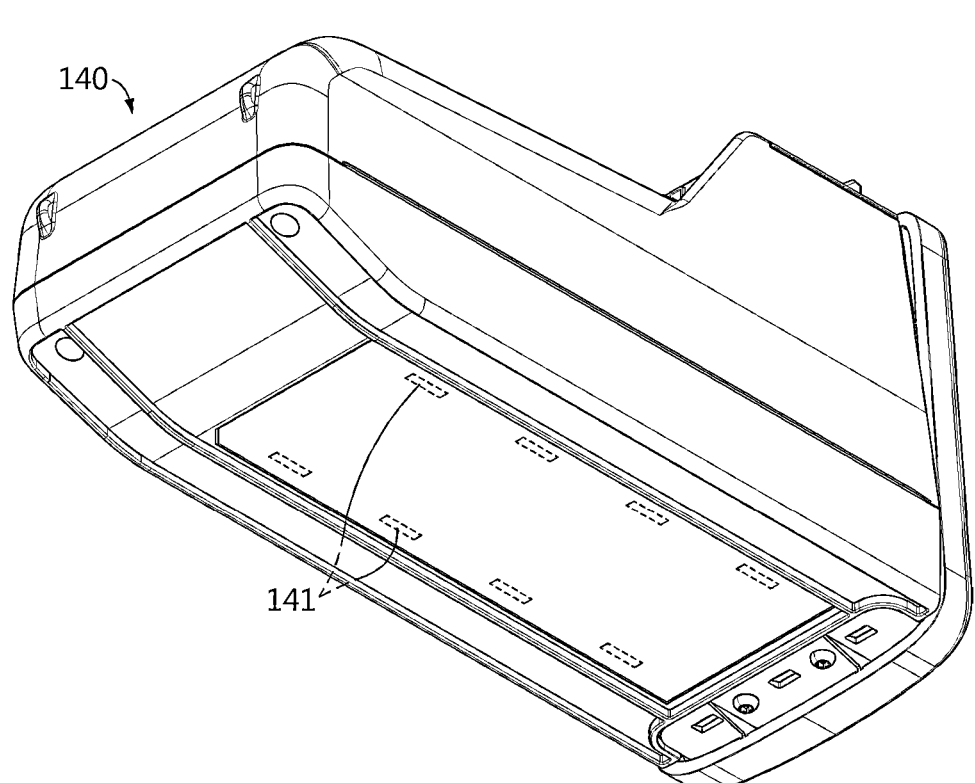
FIG. 8 is a bottom perspective view schematically showing a battery pack according to an embodiment of the present disclosure.

FIG. 8 is a bottom perspective view schematically showing a battery pack according to an embodiment of the present disclosure.

Referring to FIGS. 7 and 8 again, the pack housing 140 may have an accommodation space for accommodating the cell frame 120 therein. The pack housing 140 may include a discharge portion 141 configured such that the internal material S ejected from each of the plurality of battery cells 110 may be discharged to the outside. The discharge portion 141 may be a portion of the outer wall of the pack housing 140. Also, the discharge portion 141 may be formed at a portion of the pack housing 140 facing the distal end of the moving passage P. The discharge portion 141 may be formed, for example, at the lower portion of the pack housing 140. The pack housing 140 may have a plurality of discharge portions 141. For example, as shown in FIG. 8, eight discharge portions 141 may be formed to be spaced apart from each other by a predetermined distance at the lower portion of the pack housing 140. However, the discharge portion 141 of the pack housing 140 is not necessarily formed only in this form, but may be formed anywhere as long as it faces the distal end of the moving passage P. For example, the plurality of discharge portions 141 may not be spaced apart from each other by a predetermined distance, but may extend in the front-rear direction to be connected to each other.

In addition, the pack housing 140 may have the discharge portion 141 configured to be perforated by the internal material S. For example, the discharge portion 141 may be configured such that a portion thereof is melted and perforated by a gas or a flame having a predetermined temperature or higher. The predetermined temperature may be, for example, 310 degrees Celsius or higher. Also, the discharge portion 141 may be configured to be perforated when the internal pressure in the pack housing 140 increases over a predetermined pressure. For example, the discharge portion 141 may be configured to be perforated when the internal pressure in the pack housing 140 is 2 atmospheres or higher. For example, the pack housing 140 may include a polycarbonate material.

Therefore, according to this configuration of the present disclosure, the battery pack 100 of the present disclosure includes the pack housing 140 provided with the guide cover 130 and the discharge portion 141. Thus, when the internal material S is discharged due to abnormal behavior (thermal runaway, explosion) of the plurality of battery cells 110, the discharged internal material S (gas, flame, etc.) moves along the set moving passage P and may be discharged to the outside through the discharge portion 141 of the pack housing 140 located at the distal end of the moving passage P. Accordingly, in the battery pack 100 of the present disclosure, the generated high-temperature gas and flame may move in an intended direction through the moving passage P, thereby preventing damage to other components inside the battery pack 100. Moreover, since the battery pack 100 of the present disclosure can be configured to discharge high-temperature gas and flame to a location where damage to an external device or a user adjacent to the battery pack 100 can be minimized, the safety of the battery pack 100 may be effectively improved.

Referring to FIGS. 7 and 8 again, the discharge portion 141 may be formed to be relatively thinner in thickness than other portion adjacent to a portion of the pack housing 140. For example, the thickness of the outer wall of the discharge portion 141 may be 0.5-1 mm. The thickness of the outer wall of the other portion adjacent to the discharge portion 141 may be about 3 mm. That is, the outer wall of the discharge portion 141 has a relatively thin thickness compared to other adjacent portion, so that it is melted earlier than other adjacent portion by high-temperature gas or flame. As a result, the molten portion may be lost to the outside to form an opening. The internal material S (gas, flame) may be discharged to the outside through the formed opening of the discharge portion 141.

Therefore, according to this configuration of the present disclosure, since the present disclosure includes the discharge portion 141 formed to be relatively thinner in thickness than other portion adjacent to a portion of the pack housing 140, the discharge portion 141 is self-perforated by high-temperature gas or flame ejected by thermal runaway or explosion of the plurality of battery cells 110 without an additional separate member or control, thereby effectively discharging the internal material S to the outside. Accordingly, the battery pack 100 of the present disclosure may improve the safety against thermal runaway, fire, and explosion of the plurality of battery cells 110 without additional components. Ultimately, it is possible to reduce manufacturing cost of the battery pack 100.

Referring to FIGS. 5 to 7 again, the cell frame 120 may include a screen rib 123. The screen rib 123 may be configured to prevent the internal material S discharged from the plurality of battery cells 110 from moving in a direction opposite to the direction in which the discharge portion 141 is located. The screen rib 123 may have a protruding shape to surround the outer periphery of the guide cover 130. Also, the screen rib 123 may be formed in a protruding shape to surround the remaining outer circumferential surface of the guide cover 130 excluding the end (lower end) of the guide cover 130 facing the discharge portion 141. For example, as shown in FIG. 5, the screen rib 123 may be formed at the left end and the right end of the cell frame 120, respectively. The screen rib 123 formed at the right end may be formed in plurality to cover the upper end, the rear end, and the front end of the guide cover 130B provided on the right side. The screen rib 123 formed at the left end may be formed in plurality to cover the upper end, the rear end, and the front end of the guide cover 130A provided on the left side.

In addition, the guide cover 130 may include a bent portion 132 positioned to face the screen rib 123. The guide cover 130 may have a plate shape to cover one side of the plurality of battery cells 110. The bent portion 132 may be formed by extending in a bent form in an inward direction (a direction in which the battery cell 110 is located) from the outer periphery having a plate shape of the guide cover 130. The bent portion 132 may be configured to guide the movement of the internal material S so that the internal material S discharged from the plurality of battery cells 110 can move downward without moving upward, forward, and backward of the guide cover 130. For example, as shown in FIG. 5, the bent portion 132 extending in a bent form in an inward direction where the battery cell 110 is located may be formed at the upper end, the front end, and the rear end of the guide cover 130B located on the right side. For example, as shown in FIG. 6, the bent portion 132 extending in a bent form in an inward direction where the battery cell 110 is located may be formed at the upper end, the front end, and the rear end of the guide cover 130A located on the left side.

Therefore, according to this configuration of the present disclosure, the cell frame 120 includes the screen rib 123, and the guide cover 130 includes the bent portion 132. Thus, when a gas explosion or fire occurs due to thermal runaway in any one of the plurality of battery cells 110, the internal material S (gas, flame) ejected to the outside of the battery cell 110 may be moved toward the discharge portion 141 of the pack housing 140 by the screen rib 123 of the cell frame 120 and the bent portion 132 of the guide cover 130. Accordingly, high-temperature gas or flame can be moved and discharged to an intended location, thereby reducing damage to other components inside the battery pack 100 and preventing high-temperature gas or flame from being transmitted to an external device or a user located close to the battery pack 100.

Figure 9:
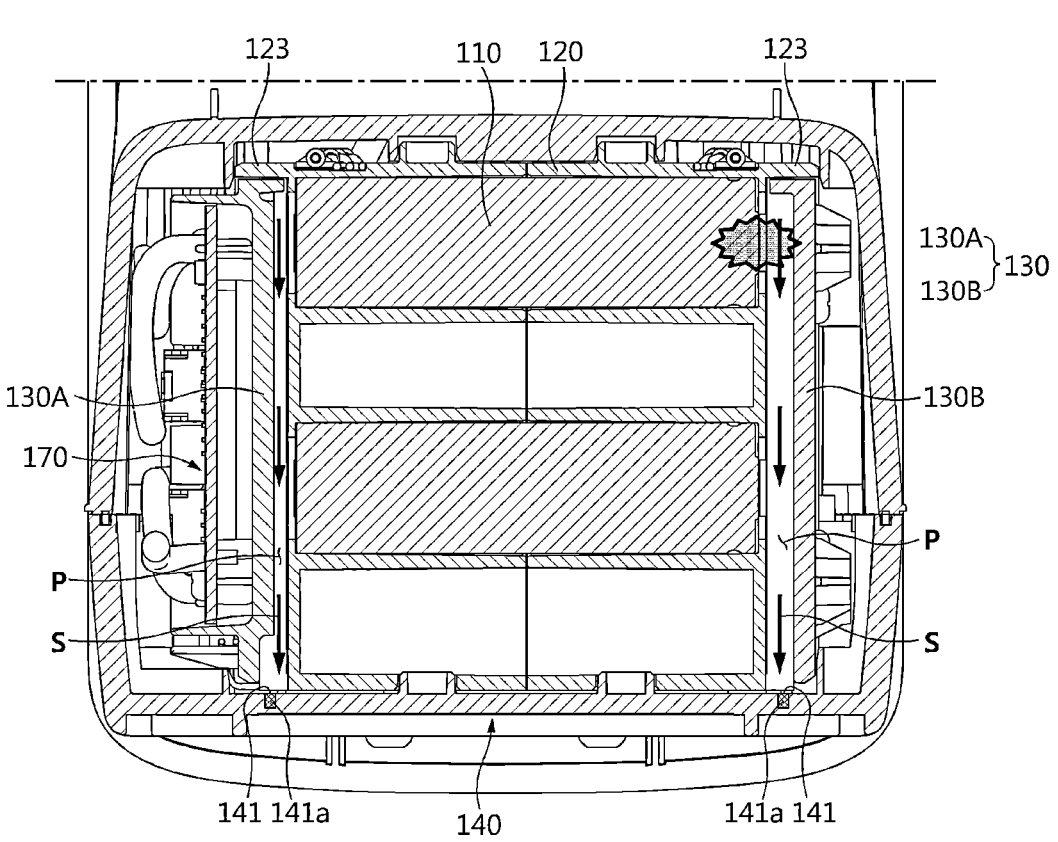
FIG. 9 is a partial vertical cross-sectional view schematically showing a cut-away state of a battery pack according to another embodiment of the present disclosure.

FIG. 9 is a partial vertical cross-sectional view schematically showing a cut-away state of a battery pack according to another embodiment of the present disclosure.

Referring to FIG. 9 along with FIG. 8 again, the battery pack 100 according to another embodiment of the present disclosure, as compared to the battery pack 100 in FIG. 7, may include the discharge portion 141 having a material 141a that is melted at a predetermined temperature or higher.

Specifically, the discharge portion 141 included in the pack housing 140 of the battery pack 100 in FIG. 9 may have the material 141a melted at a predetermined temperature or higher in at least a portion thereof. The material may be a metal that is melted at a predetermined temperature or higher. For example, the material may include at least one of lead (Pb) having a melting point of about 327 degrees Celsius, zinc (Zn) having a melting point of about 420 degrees Celsius, and tellurium having a melting point of about 450 degrees Celsius. For example, the predetermined temperature may be 327 degrees Celsius or higher.

That is, when the inner temperature of the pack housing 140 increases over a predetermined temperature, or when the discharge portion 141 comes into contact with high-temperature gas and flame, at least a portion of the discharge portion 141 may be configured to be melted and perforated.

Therefore, according to this configuration of the present disclosure, the material 141a that is melted at a predetermined temperature or higher is provided, so that when high-temperature gas and flame are generated, the discharge portion 141 of the pack housing 140 is melted and perforated to discharge the high-temperature gas and flame to the outside. Accordingly, in the battery pack 100 of the present disclosure, the generated high-temperature gas and flame can be discharged to the intended portion and direction of the pack housing 140, thereby minimizing damage to an external device or a user adjacent to the battery pack 100. Ultimately, the safety of the battery pack 100 of the present disclosure may be effectively improved.

Figure 10:
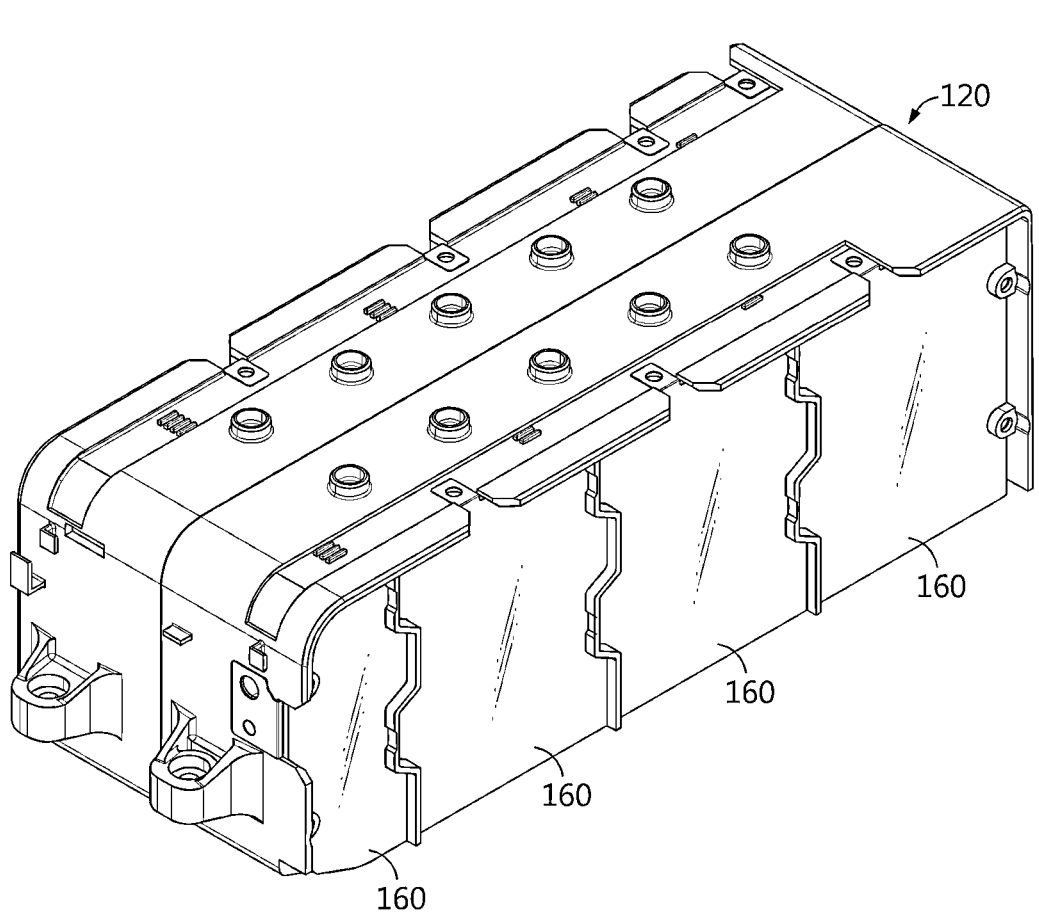
FIG. 10 is a perspective view schematically showing some configurations of a battery pack according to still another embodiment of the present disclosure.

FIG. 10 is a perspective view schematically showing some configurations of a battery pack according to still another embodiment of the present disclosure. Also, FIG. 11 is a partial vertical cross-sectional view schematically showing a cut-away state of a battery pack according to still another embodiment of the present disclosure.

Figure 11:
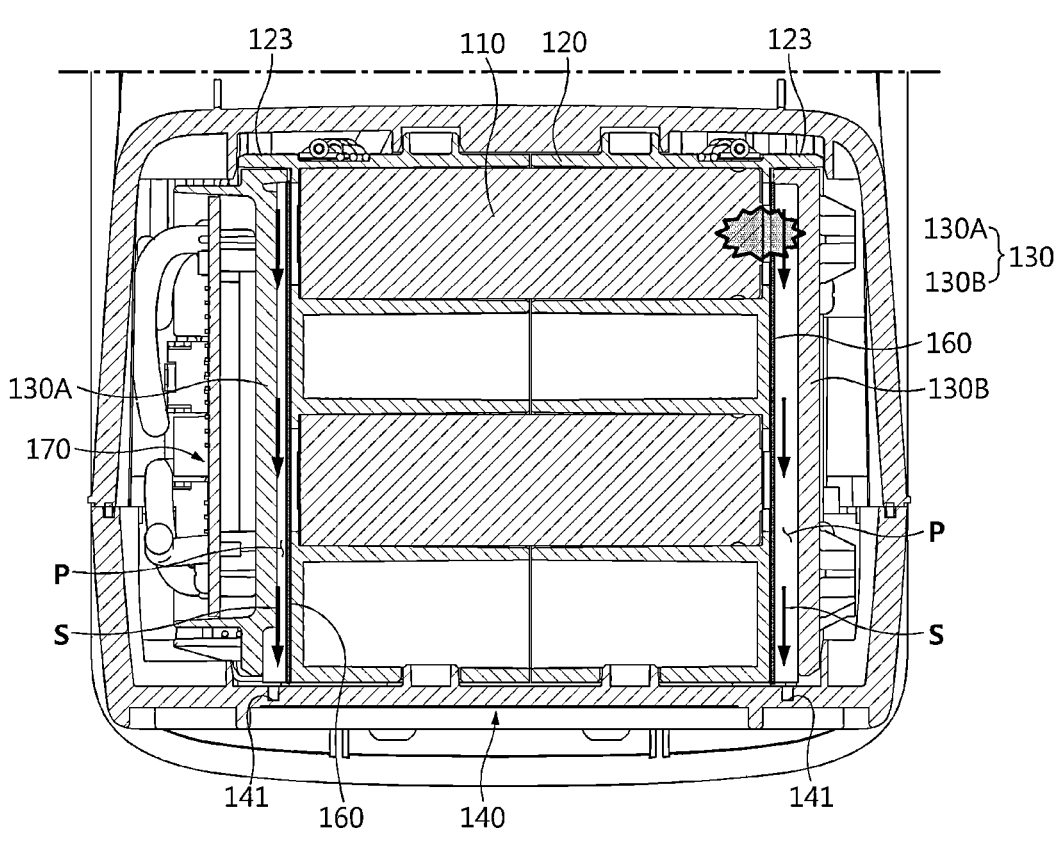
FIG. 11 is a partial vertical cross-sectional view schematically showing a cut-away state of a battery pack according to still another embodiment of the present disclosure.

Referring to FIGS. 10 and 11 along with FIGS. 2 and 3 again, the battery pack in FIG. 10 according to another embodiment of the present disclosure may further include a cover film 160 when compared with the configurations of the battery pack 100 in FIG. 2. Specifically, the cover film 160 may be configured to cover one side of the plurality of battery cells 110 from which the internal material S is discharged. The cover film 160 may have a shape extending in the vertical and front-rear directions to cover one side of the plurality of battery cells 110. The cover film 160 may be added to the outer surface of the connection plate 150. For example, the cover film 160 may be attached to the outer surface of the connection plate 150. Alternatively, the cover film 160 may have a size corresponding to a portion of the cell frame 120 on which the connection plate 150 is mounted. The cover film 160 may be configured to cover the exposure hole of the cell frame 120.

The cover film 160 may include an electrically insulating material. The cover film 160 may be, for example, a polyethylene film. The cover film 160 may be located in a separated space between the guide cover 130 and the cell frame 120. That is, the cover film 160 may be provided inside where the plurality of battery cells 110 are located, in the moving passage P.

In addition, the cover film 160 may be configured such that a portion thereof is ruptured and perforated when a high-temperature gas or flame is ejected from any one of the plurality of battery cells 110. On the contrary, a portion of the cover film 160 facing the battery cell 110 in which no fire or gas explosion has occurred among the plurality of battery cells 110 may not be perforated. That is, the cover film 160 may be disposed to face one side of the plurality of battery cells 110 on which the vent unit C2 is formed. Also, the high-temperature gas or flame passing through the cover film 160 may move along the moving passage P.

Therefore, according to this configuration of the present disclosure, the present disclosure is configured to cover one side from which the internal material S of the plurality of battery cells 110 is discharged. Thus, when a high-temperature gas or flame is ejected from any one of the plurality of battery cells 110, a portion thereof may be ruptured to allow the high-temperature gas or flame to move to the moving passage P. In addition, the cover film 160 of the present disclosure may prevent the high-temperature gas or flame moving through the moving passage P from flowing into the other battery cells in which a fire or explosion does not occur among the plurality of battery cells 110. Ultimately, the safety of the battery pack 100 may be effectively improved.

Meanwhile, referring to FIGS. 2 and 3 again, the cell frame 120 of the battery pack 100 according to an embodiment of the present disclosure may include at least one partition rib 124. The partition rib 124 may prevent the high-temperature gas or flame from moving to the other battery cells 110 when a gas explosion or fire occurs in one or more of the plurality of battery cells 110. Also, the generated gas and flame may be induced by the partition rib 124 to move in a downward direction where the discharge portion 141 is located. The partition rib 124 may have a shape protruding toward the guide cover 130. The partition rib 124 may extend along the moving passage P. For example, as shown in FIGS. 2 and 3, three partition ribs 124 may be provided on the right side of the cell frame 120 and three partition ribs 124 may be provided on the left side of the cell frame 120. The six partition ribs 124 may have a shape extending in the vertical direction.

Therefore, according to this configuration of the present disclosure, since the present disclosure includes at least one partition rib 124 protruding toward the guide cover 130 and extending along the moving passage P, it is possible to prevent the high-temperature gas or flame moving through the moving passage P from flowing into the other battery cells 110 in which a fire or explosion has not occurred among the plurality of battery cells 110. Ultimately, the safety of the battery pack 100 may be effectively improved.

Figure 12:
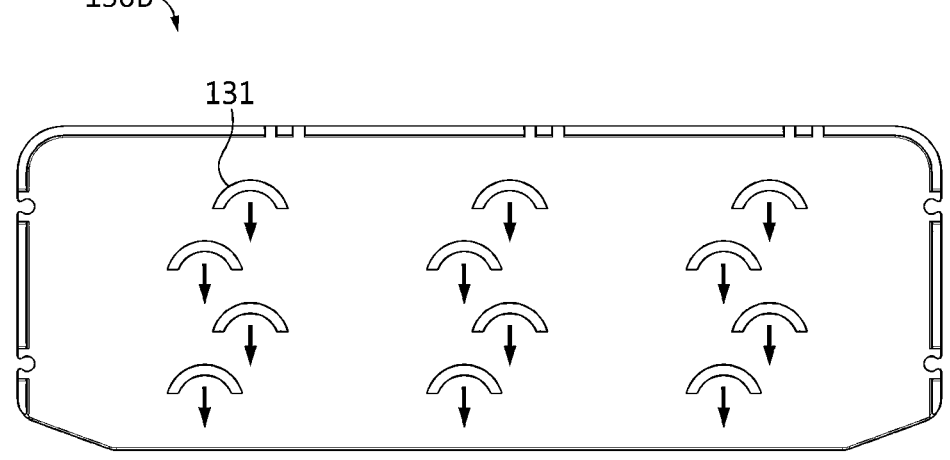
FIG. 12 is a left side view schematically showing a guide cover of a battery pack according to still another embodiment of the present disclosure.

FIG. 12 is a left side view schematically showing a guide cover of a battery pack according to still another embodiment of the present disclosure.

Referring to FIG. 12 along with FIG. 7, the guide cover 130 of the battery pack 100 according to still another embodiment of the present disclosure may further include a guide rib 131 when compared with the guide cover 130 in FIG. 5. The battery pack 100 according to still another embodiment may be the same as the other configurations of the battery pack 100 in FIG. 1.

Specifically, the guide cover 130 in FIG. 12 may include a plurality of guide ribs 131. The guide rib 131 may be configured to change a moving direction of the internal material S discharged from the battery cell 110 to one direction. The guide rib 131 may be configured to be formed on one surface facing at least some of the plurality of battery cells 110. The guide cover 130 may include at least one guide rib 131. For example, the guide rib 131 may be positioned to correspond to one side of the plurality of battery cells 110 from which the internal material S is discharged.

In addition, the guide rib 131 may be configured to change a moving direction of the internal material S ejected from the battery cell 110 in a direction where the discharge portion 141 is located. When viewed from the left, the guide rib 131 may have a circular arc shape with an open lower portion. In the circular arc shape where the lower portion of the guide rib 131 is opened, a moving direction of the gas and flame ejected from the battery cell 110 may be switched downward by the circular arc shape. For example, as shown in FIG. 12, the guide cover 130 may include twelve guide ribs 131.

Therefore, according to this configuration of the present disclosure, since the present disclosure includes a guide rib 131 configured to change a moving direction of the internal material S discharged from the battery cell 110 to one direction on the guide cover 130, it is possible to induce the internal material S ejected from the battery cell 110 to change a moving direction in a direction where the discharge portion 141 is located, thereby controlling more effectively the ejected gas or flame to move toward the discharge portion 141 when compared with the battery pack 100 in FIG. 1.

Figure 13:
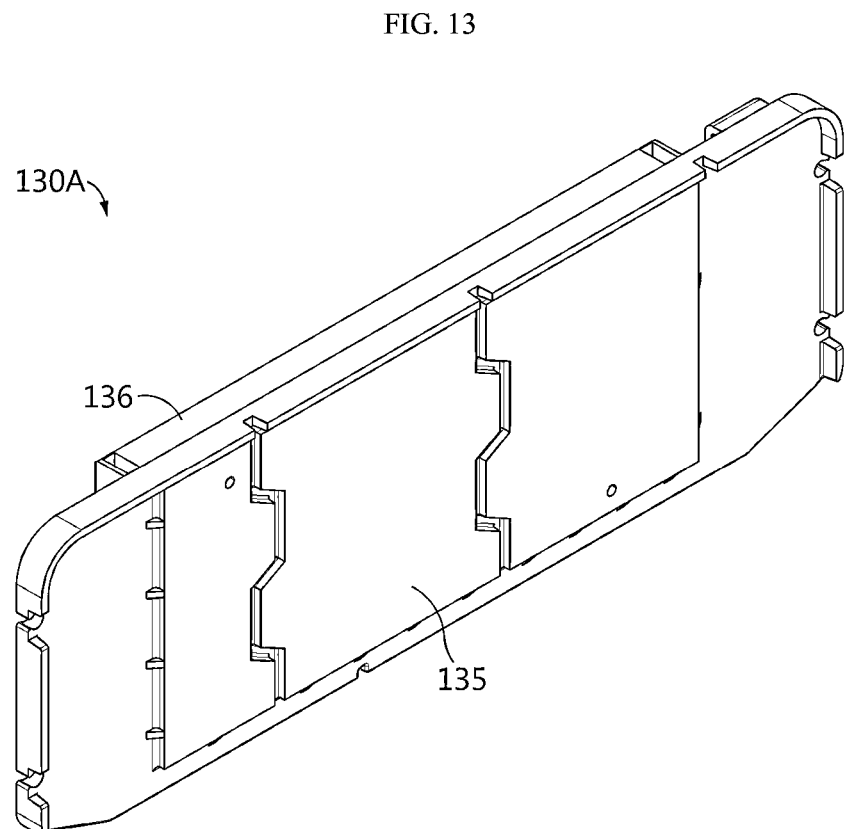
FIG. 13 is a perspective view schematically showing another guide cover of a battery pack according to an embodiment of the present disclosure.

FIG. 13 is a perspective view schematically showing another guide cover of a battery pack according to an embodiment of the present disclosure.

Referring to FIG. 13 along with FIGS. 6 and 7, the battery pack 100 according to an embodiment of the present disclosure may further include a BMS module 170. The BMS module 170 may be configured to control charge/discharge of the plurality of battery cells 110. Besides, the battery pack 100 may further include a current sensor, a fuse, and the like.

In addition, the battery pack 100 may include two or more guide covers 130. Among the two or more guide covers 130, any one guide cover 130 may include a BMS mounting portion on which a BMS module 170 is mounted. For example, the BMS module 170 may be mounted on the BMS mounting portion 136 formed on the other side opposite to the one side facing the plurality of battery cells 110 of the guide cover 130.

In addition, the guide cover 130 may include a reinforcing portion 135 on one side facing the plurality of battery cells 110. The reinforcing portion 135 may be a portion formed on one side of the guide cover 130 having a relatively thicker thickness than the other portion. That is, the reinforcing portion 135 may be a portion protruding toward the plurality of battery cells 110 from one side of the guide cover 130.

Therefore, according to this configuration of the present disclosure, the present disclosure includes the reinforcing portion 135 in the guide cover 130 on which the BMS module 170 is mounted. Thus, when an explosion or fire occurs in the plurality of battery cells 110 mounted on the cell frame 120, it is possible to avoid exposure of the BMS module 170 to the generated gas and flame by the guide cover 130, and to minimize the transfer of heat from the high-temperature gas and flame, thereby minimizing the damage or malfunction of the BMS module 170.

Meanwhile, an electric wheelchair (not shown) according to an embodiment of the present disclosure includes at least one of the above-described battery packs 100. Herein, the electric wheelchair refers to a wheelchair capable of rotating and moving wheels with the power driven by the electric motor. The electric wheelchair may further include a pack mounting case having a storage space for accommodating the plurality of battery packs 100. For example, the pack mounting case may be disposed under a chair portion of the electric wheelchair.

Meanwhile, a vehicle (not shown) according to an embodiment of the present disclosure includes at least one of the above-described battery packs 100. The vehicle may further include a mounting portion having a storage space for accommodating the plurality of battery packs 100. For example, the battery pack 100 may be mounted on a vehicle body. For example, the vehicle generates a moving force by supplying power of the battery pack 100 to the electric motor, and may refer to any device that moves using the moving force. For example, the vehicle may be an electric vehicle, an electric bike, an electric bicycle, or an electric kickboard.

Meanwhile, the terms indicating directions as used herein such as upper, lower, left, right, front and rear are used for convenience of description only, and it is obvious to those skilled in the art that the term may change depending on the position of the stated element or an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| [Reference Signs] | |
| --- | --- |
| 100: battery pack | 110: battery cell |
| 120: cell frame | 121, 122: first frame, second frame |
| 130, 130a, 130b: guide cover | 140: pack housing |
| 141: discharge portion | P: moving passage |
| 123: screen rib | 132: bent portion |
| 141a: melted material | 150: connection plate |
| 160: cover film | 124: partition rib |
| 131: guide rib | 170: BMS module |
| 135: reinforcing portion | 136: BMS mounting portion |

What is claimed is:
1. A battery pack, comprising:
a plurality of battery cells, each configured to discharge an internal material to an outside by an internal pressure when the internal pressure is greater than a predetermined pressure;
a cell frame configured to accommodate the plurality of battery cells so that the internal material is discharged in at least one direction;
one or more guide covers configured to cover at least one side of the plurality of battery cells, at least a portion of the one or more guide covers is spaced apart from the cell frame by a predetermined distance to form a moving passage through which the internal material moves; and

US 12,671,142 B2

13 a pack housing having an accommodation space config-
ured to accommodate the cell frame therein and a
discharge portion such that a portion facing a distal end
of the moving passage is configured to be perforated by
the internal material.

2. The battery pack according to claim 1, wherein the
discharge portion is formed to have a thickness smaller than
thicknesses of other portions the pack housing adjacent to
the discharge portion.

3. The battery pack according to claim 1, wherein the cell
frame comprises a screen rib protruding to surround the
outer periphery of the guide cover, and,
    wherein the guide cover comprises a bent portion facing
    the screen rib and extending in a bent form from the
    outer periphery in an inward direction.

4. The battery pack according to claim 1, wherein the
discharge portion comprises a material that melts at 310
degrees Celsius or higher.

5. The battery pack according to claim 1, further com-
prising:
    a cover film in the moving passage and extending to cover
    one side from which the internal material of the plu-
    rality of battery cells is configured to be discharged.

6. The battery pack according to claim 1, wherein the cell
frame comprises at least one partition rib protruding toward
the guide cover and extending along the moving passage.

7. The battery pack according to claim 1, wherein the
guide cover comprises a guide rib disposed at a position
corresponding to at least a portion of the plurality of battery
cells and is configured to change a moving direction of the
internal material discharged from the battery cell to one
direction.

8. The battery pack according to claim 1, further com-
prising:
    a BMS module configured to control charge/discharge of
    the plurality of battery cells,
    wherein the BMS module is disposed on the other side
    opposite to one side facing the plurality of battery cells
    of the guide cover, and the guide cover has a reinforc-
    ing portion in which a portion of the guide cover is
    thicker than a portion on one side of the guide cover
    facing the plurality of battery cells.

9. An electric wheelchair, comprising at least one battery
pack according to claim 1.

10. A vehicle, comprising at least one battery pack accord-
ing to claim 1.

* * * * *